United States Patent [19]
Blaise et al.

[11] 3,714,297
[45] Jan. 30, 1973

[54] HYDROXY HALOGENATED ELASTOMERS RESISTANT TO OILS

[75] Inventors: Jean Blaise, Lyon; Edouard Grimaud, Oullins, both of France

[73] Assignee: Ugine Kuhlmann, Paris, France

[22] Filed: March 24, 1970

[21] Appl. No.: 22,375

Related U.S. Application Data

[63] Continuation-in-part of Ser. No. 675,319, Oct. 6, 1967, abandoned.

[52] U.S. Cl. ................260/890, 204/159.2, 260/5, 260/77.5 CR, 260/78.4 D, 260/79.5 B, 260/82.1, 260/83.3, 260/85.1, 260/94.7 A, 260/784, 260/785, 260/894, 260/887
[51] Int. Cl. ......C08f 27/02, C08f 27/06, C08f 27/08
[58] Field of Search..260/41.5 R, 5, 79.5 PB, 94.7 A, 260/82.1, 83.3, 77.5 CR, 887, 890, 78.4 D, 83.5; 204/159.2

[56] References Cited

UNITED STATES PATENTS

| | | | |
|---|---|---|---|
| 2,660,563 | 11/1953 | Banes | 260/94.7 |
| 3,244,774 | 4/1966 | Kaupp | 260/897 |
| 3,317,479 | 5/1967 | Noshay | 260/77.5 |

*Primary Examiner*—James A. Seidleck
*Assistant Examiner*—C. A. Henderson, Jr.
*Attorney*—Pennie, Edmonds, Morton, Taylor and Adams

[57] ABSTRACT

Novel hydroxyhalogenated elastomers are produced by first partially epoxidizing a high molecular diene elastomer in a solvent medium and then reacting the partially epoxidized product with a hydrohalogen acid in a solvent medium. Diene elastomers such as polymer and copolymers of butadiene, isoprene, dimethyl-2,3-butadiene, chloroprene, cyanobutadienes and piperylene are first epoxidized and then reacted with hydrohalogenated acids such as hydrochloric, hydrobromic, hydriodic and mixtures thereof. The hydroxyhalogenated elastomers thus produced can be vulcanized by an extremely broad range of vulcanization agents and covulcanized with many other elastomers. The vulcanizates of these elastomers are characterized by such properties as very good resistance to aromatic and aliphatic solvents and oils, excellent stability at high or low temperatures and low moisture absorption.

3 Claims, No Drawings

HYDROXY HALOGENATED ELASTOMERS RESISTANT TO OILS

This application is a continuation-in-part of application Ser. No. 675,319 filed Oct. 6, 1967 now abandoned.

BACKGROUND OF THE INVENTION

1. Field of the Invention

This invention relates to the production of novel hydroxyhalogenated elastomers. In particular, it relates to the production of these elastomers by first partially epoxidizing a diene elastomer in a solvent medium and then reacting the partially epoxidized product with a hydrohalogen acid in a solvent medium.

2. Description of the Prior Art

There presently exist a number of known diene elastomers which, when modified by copolymerization or by chemical reaction, carry hydroxyl, nitrile, or halogen groups and, as a result of their particular structure, exhibit specific properties such as good resistance to aliphatic or aromatic hydrocarbons, stability at either low or high temperatures, good aging resistance, low moisture absorption and good adhesion to different substrates. These desirable qualities, however, are never all combined in the same elastomer.

Presently known methods of simultaneous addition of halogen and hydroxyl groups to unsaturated elastomers, as, for example, by the reaction of hypohalogenous acids with these unsaturated elastomers, are accompanied by parasite halogenation and/or cyclization reactions which considerably lessen the elastic nature of the polymers produced. The new hydroxyhalogenated elastomers produced according to the present invention offer a remarkable stability which is unexpected in view of their polyhalohydrin structure.

The vulcanizates of these novel hydroxyhalogenated elastomers have properties which vary with respect to the nature of the halogen, the number of halogen atoms and hydroxyl groups carried by the macromolecular chain, the method of vulcanization used and the fillers, if any, which are used. They are, however, generally characterized by very good resistance to aromatic solvents and aromatic oils, and they have excellent stability at low temperatures. Heat and oxidation resistance is also improved in relation to the standard diene elastomers. Additionally, these vulcanizates are self-extinguishing and burn with great difficulty. Their flame resistance can easily be increased in considerable proportion by the addition of small quantities of antimony derivatives.

SUMMARY OF THE INVENTION

The present invention is based on the discovery that novel hydroxyhalogenated elastomers, having exceptionally good elastomeric properties, can be produced by first partially epoxidizing a high molecular diene elastomer in a solvent medium and then reacting the partially epoxidized product with a hydrohalogen acid in a solvent medium.

Broadly stated this invention comprises novel solid hydroxyhalogenated elastomers and a process for manufacturing the same. The solid hydroxyhalogenated elastomers of this invention contain $x$ units of the general formula

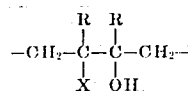

randomly linked to $y$ units of the general formula

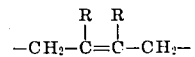

wherein R and R' each represent a member of the group consisting of hydrogen, halogen, an alkyl radical containing from one to four carbon atoms and a nitrile group, X represents a halogen, $x$ and $y$ represent positive integers, the sum of which is greater than about 600. The value of $x$ may be from about 5 percent to about 95 percent and preferably from 10 to 70 percent of the sum $(x+y)$.

The process comprises:

a. Partially epoxidizing a diene elastomer in a solvent medium, b. Reacting the partially epoxidized diene elastomer with a hydrohalogen acid in a solvent medium, and c. Recovering the hydroxyhalogenated elastomer produced thereby.

The reaction can be represented by the following reation sequences:

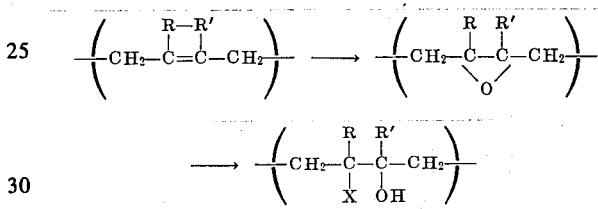

in which formula R', and X represent the radicals described above.

In the first stage of the process, the diene elastomers undergo epoxidation in a solvent medium by known means such as by reaction with organic peracids which may either be preformed or formed in situ during the reaction. The epoxidation of the diene is only partial in nature, epoxy groups forming on substantially less than all of the double bond reaction sites.

The second stage of the process comprises reacting the partially epoxidized elastomer with an aqueous solution of a hydrohalogen acid in a solvent medium. This serves to open the epoxy group and form two new groups at this site: a hydroxyl group and a halogen group.

The hydroxyhalogenated elastomers thus formed have three potential reaction sites in their chains: carbon-carbon double bonds, halogen atoms, and hydroxyl groups. These compounds, therefore, can be vulcanized by an extremely broad range of vulcanization agents. Furthermore, since these compounds are compatible with most of the elastomers now on the market it is also possible for them to be covulcanized with these elastomers and, therefore, the properties of the resulting compounds can be altered to satisfy specific needs. The process of the invention, therefore, makes it possible to combine the greatest number of desirable properties in the same elastomer by assembling on a polymer chain a suitable number of ethylenic double bonds, hydroxyl groups and halogen atoms.

DESCRIPTION OF THE PREFERRED PRACTICE OF THE INVENTION

Diene elastomers which can be partially epoxidized according to the process of this invention include such compounds as polybutadienes, natural or synthetic polyisoprenes, poly-(dimethyl-2,3-butadienes), polypiperylenes, polychloroprenes, poly-(cyanobutadienes) and, in general, all conjugated diolefin polymers, as well as the grafted, block or joined statistical copolymers that these conjugated diolefins can form among themselves or in combination with monoolefin compounds such as styrene, vinyltoluene, α-methylstyrene, acrylic, methacrylic, fumaric, maleic, itaconic, methylene-glutaric, cyanoethyl-acrylic acids, nitriles and esters, or non-conjugated diolefin compounds, such as divinylbenzene. These polymers or copolymers should, however, not be overly reticulated, which would make them insoluble in the solvents used in the process. The stereospecific polymers of conjugated dienes, such as polybutadienes or polyisoprenes with high 1,4-cis bond content constitute preferred raw materials.

The molecular weight of the diene products described above and which can be partially epoxidized must be high enough so that they are solids and have good elastomer properties. The molecular weights can range from about $10^5$ to $10^7$ and are chosen only with regard to the use envisaged for the reaction products. Situations may arise where an elastomer may be desired which has a greater or a lesser molecular weight than that included in the aforementioned weight range, in which case the practice of this invention can be modified accordingly. In general, it is sufficient for the purposes of this invention, to describe the novel hydroxyhalogenated elastomers herein as having a general formula in which the recurring formula unit is sufficiently large to result in a polymer having a molecular weight from about 100,000 to about 10 million or from about $10^5$ to $10^7$.

The reactions involved in the present invention do not cause degradation of the dienic elastomer chain. Thus the degree of polymerization, i.e., the total number of recurring units, is practically the same in the hydrohalogenated elastomer as in the initial dienic polymer. The molecular weight of the hydroxyhalogenated elastomer is somewhat greater than the molecular weight of the initial dienic polymer, depending on the particular X substitute employed and on the extent of the hydroxyhalogenation reaction. For instance the polybutadiene used in Example 1 ($R = R' = H$) has a molecular weight of about 190,000 according to the equation of F. DANUSSO et al. (J. Polymer Sci., 51, 475, 1961) or 280,000 according to the equation of W. COOPER et al. (J. Polymer Sci., 59, 241, 1962). After hydroxychlorination to the extent of 29 percent, the calculated molecular weights become respectively about 244,000 or 359,000. It can be said that the molecular weights of the diene elastomers being reacted according to this invention can be varied as long as the molecular weight is sufficiently high to result in products which are solid and have good elastic properties.

In the first stage of the process, the diene elastomers undergo partial epoxidation in a solvent medium produced by known means, such as by reaction with organic peracids, which can be either preformed or formed in situ during the reaction. Epoxidation by reaction with mixtures of hydrogen peroxide and formic acid is preferred.

The extent of epoxidation of the diene elastomer, as defined by the ratio of the number of epoxide groups formed to the number of initial double bonds, can vary from 5 to 95 percent. Preferably this range varies from 10 percent to no more than 70 percent. The epoxidation reaction can be accompanied by hydroxylation or esterification reactions, but these secondary reactions should not reach more than 30 percent of the double bonds transformed. Care should be taken to avoid any reticulation reaction during epoxidation.

The solvents used during epoxidation of the diene elastomers must be capable of dissolving the elastomer in its initial state as well as after being partially epoxidized. Where epoxidation is performed with a mixture of reagents such as a mixture of hydrogen peroxide and formic acid, the solvents which can be used include aromatic hydrocarbons such as benzene, toluene and xylene, cycloalkane hydrocarbons such as cyclohexane and halogenated derivates such as chloroform or chlorobenzene.

The reaction temperature of the process is not critical and can vary from $-10°$ C. to $+120°$ C. The concentration of the elastomer solution is limited only by practical considerations such as ease of handling of the viscous solution. In general, for elastomers having a high molecular weight, it is preferable to work with solvent solutions containing from 3 percent to 20 percent elastomer concentration while for elastomers having a low molecular weight, solvent solutions of elastomer of up to 80 percent elastomer concentration can be used.

As the completion of the epoxidation step, it is advantageous to destroy the residual present in the solution by known means, such as by heating in an alkaline medium and by the addition of reducing agents or decomposition catalysts. Alkaline agents which can be used for this purpose include the oxides, hydroxides, carbonates and bicarbonates of alkali and alkaline-earth metals.

During epoxidation a number of intermolecular reactions occur, which can lead to cross-linking or gellation of the reaction mass. To reduce these parasite reactions to a minimum, an excess of epoxidation reagents is used, so as to have as fast a reaction rate as possible, and the reaction is stopped before epoxidation is complete, but also before the mass is reticulated. A part of the hydrogen peroxide is generally lost, but one obtains a high enough epoxidation rate without cross-linking or gellation. The working conditions should then be regulated so as to produce the result we have described above. In order to accomplish this it is necessary to take into account quantities of reagents, temperature, duration of reaction and the need to destroy at the end of the reaction, through the action of an alkaline medium, residual peroxides present in the solution.

The second stage of the process of this invention comprises the fixing of a hydrohalogen acid or of a mixture of hydrohalogen acids on the partially epoxidized elastomer. Hydrohalogen acids which may be used for this purpose are chosen from the group consisting of hydrochloric acid, hydrobromic acid, and hydriodic acid. These acids are used in the form of aqueous solution. Excess acid in relation to the epoxide groups of the elastomer is generally used so as to obtain a quantitative reaction.

The second stage of the process is advantageously carried out in solution and it is desirable to use in connection therewith a solvent or a mixture of solvents capable of dissolving at the same time both the partially epoxidized elastomer and the hydroxyhalogenated elastomer. Suitable solvent media include, for example, mixtures of nonpolar solvents such as aliphatic, cycloaliphatic, and aromatic hydrocarbons and their halogenated derivatives with polar solvents such as alcohols, ketones, ethers, esters, dimethylformamide, dimethylsulfoxide, pryridine, nitromethane, etc.

It is generally unnecessary to isolate the epoxidized elastomer prior to fixation of the hydrohalogen acid. Therefore, the epoxidized polymer solution of the first stage can be directly used in the second stage by, for example, adding to it one or more solvents to maintain the reaction products in solution. Since the process is performed with aqueous solutions of hydrohalogen acid, it is desirable for the reaction medium to be capable of admixture with the water brought in by these solutions.

The reaction temperature in the second stage of the process is, again, not critical and can vary, as before, from −10° C. to +120° C. The reaction time, which depends on the temperature of the process, can range from a few minutes to several hours.

The hydroxyhalogenated elastomer solution formed in the process is washed several times with water whether or not it has undergone prior treatment with alkaline agents. The elastomers may be recovered by known means such as by the evaporation of the solvents present or by their precipitation by a non-solvent. They may also be treated, if necessary, with anit-oxidants and stabilizers.

The hydroxyhalogenated elastomers produced by the method of the invention can be vulcanized by a broad range of known vulcanization agents including sulfur, sulfur-liberating compounds such as ethylene thiourea (mercapto-2-imidazoline) and many others, peroxides, high-energy radiations, metal oxides, diamines and their derivatives decomposing readily at curing temperatures, carboxylic acid anhydrides, polyfunctional isocyanates and any possible combination of these agents. The rate of vulcanization can be regulated by the use of standard and known vulcanization accelerators.

The novel hydroxyhalogenated elastomers produced in accordance with the method of this invention are compatible and most of the elastomers presently on the market and therefore, can be covulcanized with them to alter the properties of the final product.

Examples of elastomers that can be covulcanized with the elastomers of this invention include butadiene-styrene, and butadiene-acrylonitrile copolymers, natural rubber, copolymers of isobutylene and copolymerizable dienes, polybutadienes, polychloroprenes and so forth. When covulcanizing the elastomers of the invention it is advantageous to employ covulcanizable elastomers which are vulcanizable with sulfur and to use sulfur or a sulfur liberating compound as the vulcanizing agent. These elastomers can also be reinforced with active fillers such as carbon blacks, silicas or aluminas, filled with inactive products such as calcium carbonate or barium sulfate and the like, or colored with various pigments.

The following examples illustrate the process of producing hydroxyhalogenated elastomers by the method of this invention.

EXAMPLE 1

In a reactor equipped with an agitator, a dropping funnel and a reflux condenser, there are dissolved in 900 parts benzene 100 parts by weight* (*In the Examples all parts are by weight except where otherwise specified.) polybutadiene having a very high (About 95 percent or above of 1,4-cis bonds.) 1,4-cis bond content and an intrinsic viscosity equal to 200 cc/g. in benzene at 25° C. This solution is heated to 60° C. and mixed with 10.7 parts formic acid. Then 68.8 parts 50 percent hydrogen peroxide are introduced in the reactor. After 6 hours of reaction at 60° C., analysis revealed that approximately 29 percent of the polybutadiene double bonds were epoxidized. The benzene solution of epoxidized polybutadiene was then alkalized with an aqueous solution of sodium hydroxide and again heated for 1 hour at 60° C. The product was then washed with water and 1,000 parts of acetone and 200 parts of a 20 percent aqueous solution of hydrochloric acid were added to the benzene solution. This mixture was maintained at 60° C. for 2 hours and then successively washed with water and with an aqueous solution of sodium bicarbonate. The hydroxy-chlorinated polybutadiene thus produced was precipitated by the addition of methanol to the solution and it was then vacuum-dried at room temperature. The product was in the form of white lumps having a chlorine content of 12.4 percent and an intrinsic viscosity of 320 cc./g. in tetrahydrofuran at 25° C.

EXAMPLE 2

The operations of Example 1 were repeated except that 14.3 parts formic acid and 92 parts 50 percent hydrogen peroxide were used. The epoxidation level of the polybutadiene reached 33 percent. The addition of hydrochloric acid to the solution was made as in Example 1 and the hydroxychlorinated polybutadiene which was recovered was stabilized with 1 percent ditertiobutylparacresol and 1 percent epoxidized soy bean oil. The chlorine content of the polymer was found to be 14.4 percent.

EXAMPLE 3

The operations of Example 1 were repeated except that 11.3 parts formic acid and 72.5 parts 50 percent hydrogen peroxide were used. 32.5 percent of the double bonds were epoxidized. After the reaction mass was washed with water, 1,000 parts acetone were added; the mixture was heated to 60° C. and 120 parts of a 30 percent aqueous solution of hydrobromic acid were introduced. The hydroxybrominated polymer was isolated as before and stabilized with 1 percent ditertiobutyl-paracresol and 1 percent epoxidized soy bean oil. The product contained 29.8 percent bromine.

EXAMPLE 4

Epoxidation of the polybutadiene of Example 1 was repeated, using instead 6.4 parts formic acid and 41 parts 50 percent hydrogen peroxide; 19.5 percent of the double bonds were epoxidized. After washing the reaction mass with water and adding 1,000 parts acetone, the reaction mass was heated to 60° C. and 150 parts 47 percent hydriodic acid were introduced. The hydroxy-iodinated polymer was isolated as before. The polymer contained 30.3 percent iodine.

EXAMPLE 5

The hydroxychlorinated polybutadiene produced in Example 2 was vulcanized according to the following formula:

| | |
|---|---|
| Hydroxychlorinated elastomer | 100 parts |
| Maglite D* | 4 |
| Zinc oxide | 5 |
| Phenyl-$\beta$-naphthylamine | 1.5 |
| Carbon black | 40 |
| Stearic acid | 0.5 |
| Ethylenethiourea | 0.5 |

*Maglite D is a magnesium oxide of Merck and Co.

Press vulcanization was carried out for 45 minutes at 150° C. The properties of the vulcanizate are given in Table 1.

EXAMPLE 6

The hydroxychlorinated polybutadiene produced in Example 2 was covulcanized with a butadiene/styrene elastomer according to the following formula:

| | |
|---|---|
| Hydroxychlorinated elastomer | 50 parts |
| Type 1006 butadiene/styrene elastomer** | 50 |
| Maglite D | 2 |
| Zinc oxide | 5 |
| Sulfur | 1 |
| Phenyl-$\alpha$-naphthylamine | 0.7 |
| Carbon black | 40 |
| Stearic acid | 0.25 |

**According to standard ASTM-D 1419-58 T, 1006 butadiene-styrene elastomers are rubber prepared "at high temperature" (50° C.) by emulsion in the presence of a persulfate and fatty acid salts as emulsifiers. Their nominal combined styrene content is 23.5 percent and their Mooney viscosity is 50 at temperature of 100° C.

Press vulcanization was carried out for 30 minutes at 150° C. The properties of the vulcanizate are given in Table 1.

TABLE 7

The hydroxychlorinated polybutadiene produced in Example 2 was press-vulcanized at 170° C. for 15 minutes, according to the following formula:

| | |
|---|---|
| Hydroxychlorinated elastomer | 100 parts |
| Maglite D | 5 |
| Litharge | 5 |
| Stearic acid | 0.5 |
| Carbon black | 4 |
| Calcium silicate | 5 |
| Sulfur | 0.5 |
| Ethylenethiourea | 1 |

The properties of the vulcanizate, measured immediately after vulcanization, after aging for 70 hours in air at 120° C., and after aging for 70 hours in A.S.T.M. No. 3 oil at 120° C., are given in Table 1.

EXAMPLE 8

The vulcanization formula of Example 7 was used, but the five parts calcium silicate were replaced with three parts slaked lime to which was added 5 parts phenyl-$\beta$-naphthylamine.

Table 1 gives the properties of the vulcanizate measured immediately after vulcanization, after aging for 70 hours in air at 120° C., and after aging for 70 hours in A.S.T.M. No. 3 oil at 120° C.

EXAMPLE 9

The hydroxybrominated polybutadiene produced in Example 3 was press-vulcanized at 110° C. for 15 minutes, according to the following formula:

| | |
|---|---|
| Hydroxybrominated elastomer | 100 parts |
| Maglite D | 4 |
| Zinc oxide | 5 |
| Phenyl-$\beta$-naphthylamine | 1.5 |
| Carbon black | 40 |
| Stearic acid | 0.5 |
| Ethylenethiourea | 0.5 |

The properties of the vulcanizate are given in Table 1.

TABLE NO. 1

[Properties of hydroxyhalogenated elastomer vulcanizates]

| Vulcanization formula Example: | Shore A hardness | Tensile strength (bars)* | Ultimate elongation, percent * | Swelling in 50/50 mixture, B gasoline-benzene (percent by weight)** | Swelling in benzene (percent by weight)** | Swelling in ASTM No. 3 oil (percent by weight)*** | Remarks |
|---|---|---|---|---|---|---|---|
| 5 | 85/75 | 199 | 400 | 35 | 74 | | |
| 6 | 76/65 | 85 | 269 | 94 | 142 | | |
| 7 | 81/75 | 226 | 562 | 29 | 76.5 | | |
| 7 | 90/86 | 228 | 150 | | | | After 70 hrs. at 120° in air. |
| 7 | 72/67 | 234 | 258 | | | 15 | After 70 hrs. at 120° in ASTM No. 3 oil. |
| 8 | 80/74 | 225 | 558 | 28 | 74 | | |
| 8 | 97/93 | 320 | 112 | | | | After 70 hrs. at 120° in air. |
| 8 | 82/74 | 274 | 250 | | | 12.2 | After 70 hrs. at 120° in ASTM No. 3 oil. |
| 9 | 86/80 | 240 | 525 | 20 | 48 | | |

*Tensile strength and ultimate elongation were measured at 23° C. at a traction speed of 500 mm./min. on an ASTM-D test piece.
**Measurements of swelling in benzene and in B gasoline-benzene mixtures were made after 24 hr. immersion at 25° C.
***Measurements of swelling in ASTM No. 3 oil were made after 70 hours immersion at 120° C.

In order to compare and to show the advantages of the elastomers of this invention, a standard nitrile rubber (a butadiene-acrylonitrile copolymer) referred to below as BT305, and a standard polychloroprene (neoprene synthetic rubber), referred to below as polychloroprene W, were formulated as set forth in the following examples, vulcanized in the conventional manner and compared with the properties of the elastomer of Example 2 vulcanized in accordance with Example 7 of this application. In the following Examples 10 and 11, p means parts of weight.

EXAMPLE 10

| | |
|---|---|
| BT 305 gum | 100 p |
| Carbon black | 50 p |
| ZnO | 5 p |
| Stearic acid | 1 p |
| Benzothiazyl disulfide | 1.5 p |
| Sulfur | 3 p |

EXAMPLE 11

| | |
|---|---|
| Polychloroprene W gum | 100 p |
| Carbon black | 40 p |
| ZnO | 5 p |
| Maglite D | 4 p (magnesia) |
| Phenyl-β-napthylamine | 1.5 p |
| Stearic acid | 0.5 p |
| Mercapto-2-imidazoline | 0.5 p |

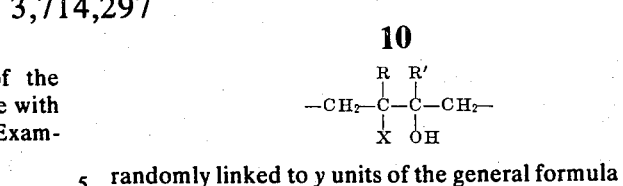

randomly linked to $y$ units of the general formula

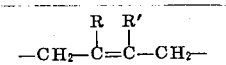

wherein R and R' each represent a member of the group consisting of hydrogen, halogen, an alkyl radical containing from one to four carbon atoms, and a nitrile group, X represents a halogen, $x$ and $y$ represent positive integers, the sum of which is greater than about 600 and correspond to an elastomer molecular weight between about $10^5$ and $10^7$ and the value of $x$ is from 5 percent to 95 percent of the same $(x+y)$.

2. Hydroxyhalogenated elastomers according to claim 1 which are vulcanized by at least one vulcanization agent of the group consisting of sulfur, sulfur-

TABLE 2

| Elastomer | Shore A hardness | Breaking strength, bars | Ultimate elongation, percent | Swelling in 50/50 mixture, gasoline (B)-benzene by percent | Swelling in benzene by percent | Swelling in ASTM No. 3 oil, percent | Remarks |
|---|---|---|---|---|---|---|---|
| Example 10: RT 305. | 93/92 | 250 | 550 | 54.1 | 122 | | |
| | | 72 | 25 | | | | After 70 hrs. at 120° in air. |
| | | 126 | 125 | | | 11.5 | After 70 hrs. at 120° in ASTM 3 oil. |
| Example 11: Polychloroprene W. | 73/71 | 238 | 325 | 84.5 | 129 | | |
| | 81/79 | 220 | 250 | | | | After 70 hrs. at 120° in air. |
| | | 125 | 179 | | | 67 | |
| Example 7 | 81/75 | 226 | 562 | 29 | 76.5 | | |
| | 90/86 | 228 | 150 | | | | After 70 hrs. at 120° in air. |
| | 72/67 | 234 | 258 | | | 15 | After 70 hrs. at 120° in ASTM 3 oil. |

It can thus be readily seen from Table 2 that the vulcanized elastomers of this invention are far superior to the commercially available nitrile and neoprene elastomers or rubbers.

We claim:

1. Solid hydroxyhalogenated elastomers comprising $x$ units of the general formula liberating compounds, peroxides, high energy radiations, metal oxides, diamines, carboxylic acid anhydrides and polyfunctional isocyanates.

3. Hydroxyhalogenated elastomers according to claim 2 which are covulcanized with one or more diene elastomers.

* * * * *